(12) United States Patent
Park et al.

(10) Patent No.: US 7,703,147 B2
(45) Date of Patent: *Apr. 20, 2010

(54) METHOD FOR FABRICATING SPM AND CD-SPM NANONEEDLE PROBE USING ION BEAM AND SPM AND CD-SPM NANONEEDLE PROBE THEREBY

(75) Inventors: Byong-Cheon Park, Taejon (KR); Ki-Young Jung, Seoul (KR); Won-Young Song, Seoul (KR); Jae-Wan Hong, Seoul (KR); Beom-Hoan O, Incheon (KR); Sang-Jung Ahn, Taejon (KR)

(73) Assignee: Korea Research Institute of Standards and Science, Taejon (KR)

( * ) Notice: Subject to any disclaimer, the term of this patent is extended or adjusted under 35 U.S.C. 154(b) by 554 days.

This patent is subject to a terminal disclaimer.

(21) Appl. No.: 11/571,239

(22) PCT Filed: Jul. 1, 2005

(86) PCT No.: PCT/KR2005/002097

§ 371 (c)(1),
(2), (4) Date: Dec. 22, 2006

(87) PCT Pub. No.: WO2006/011714

PCT Pub. Date: Feb. 2, 2006

(65) Prior Publication Data

US 2009/0106869 A1 Apr. 23, 2009

(30) Foreign Application Priority Data

Jul. 29, 2004 (KR) .................... 10-2004-0059719
May 2, 2005 (KR) .................... 10-2005-0036631

(51) Int. Cl.
*H01J 37/26* (2006.01)

(52) U.S. Cl. ............................. 850/60; 850/52; 850/57; 850/58

(58) Field of Classification Search ..................... 850/1, 850/2, 3, 5, 6, 21, 24, 30, 32, 33, 52, 53, 850/57, 58, 60; 250/306, 307, 309, 311
See application file for complete search history.

(56) References Cited

U.S. PATENT DOCUMENTS 5,838,005 A 11/1998 Majumdar et al.

(Continued)

FOREIGN PATENT DOCUMENTS

JP 2003090788 A2 3/2003

(Continued)

*Primary Examiner*—Jack I Berman
*Assistant Examiner*—Nicole Ippolito Rausch

(57) ABSTRACT

The present disclosure relates to a method for fabricating a scanning probe microscope (SPM) nanoneedle probe using an ion beam, a SPM nanoneedle probe, a method of fabricating a critical dimension scanning probe microscope (CD-SPM) nanoneedle probe using an ion beam, a CD-SPM nanoneedle probe, and uses thereof. A disclosed method can comprise: positioning the probe so that a tip of the probe on which the nanoneedle is attached faces toward a direction in which the ion beam is irradiated; and aligning the nanoneedle attached on the tip of the probe with the ion beam in parallel by irradiating the ion beam toward the tip of the probe on which the nanoneedle is attached.

26 Claims, 9 Drawing Sheets

U.S. PATENT DOCUMENTS

| | | |
|---|---|---|
| 6,246,054 B1 | 6/2001 | Toda |
| 6,528,785 B1 | 3/2003 | Nakayama et al. |
| 6,759,653 B2 | 7/2004 | Nakayama et al. |
| 7,501,618 B2 * | 3/2009 | Park et al. .................. 250/251 |
| 2002/0178799 A1 | 12/2002 | Kitazawa et al. |
| 2003/0029996 A1 * | 2/2003 | Nakayama et al. .......... 250/306 |
| 2003/0122072 A1 * | 7/2003 | Kaito et al. ................. 250/306 |
| 2005/0247886 A1 * | 11/2005 | Wang .................... 250/442.11 |

FOREIGN PATENT DOCUMENTS

| | | |
|---|---|---|
| KR | 10-2004-0021135 A | 3/2004 |

* cited by examiner

[Fig. 1]
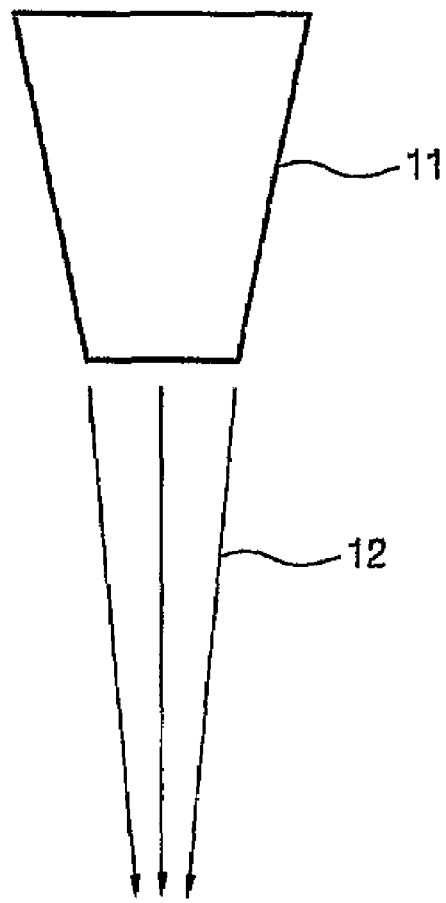
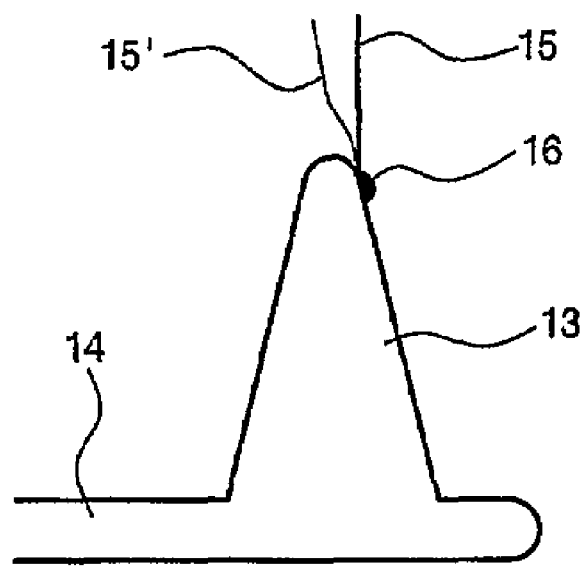

[Fig. 2]
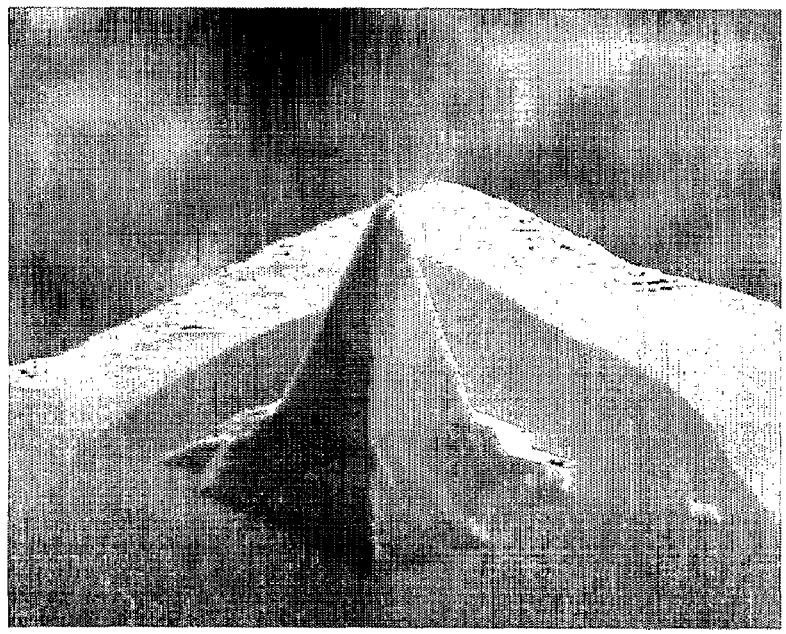
[Fig. 3]
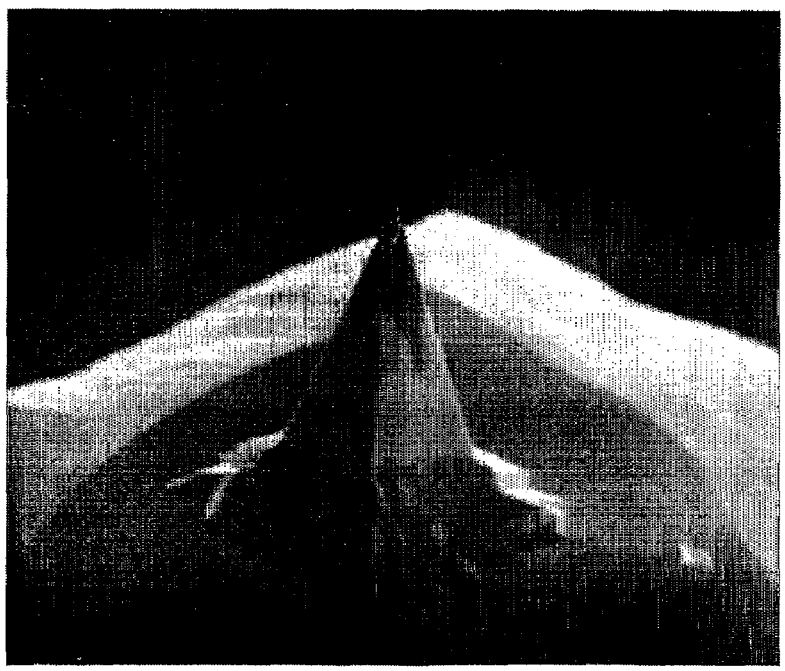

[Fig. 4]
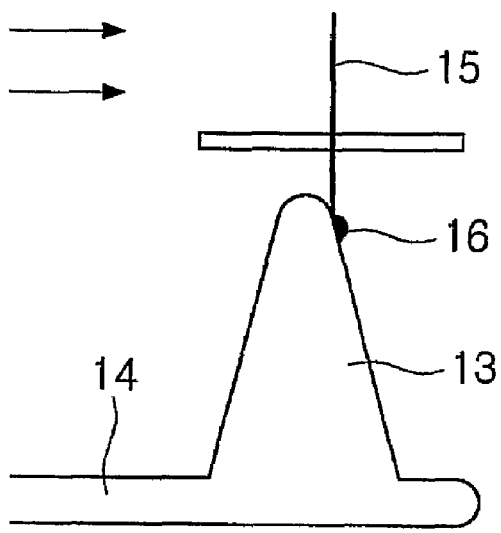
[Fig. 5]
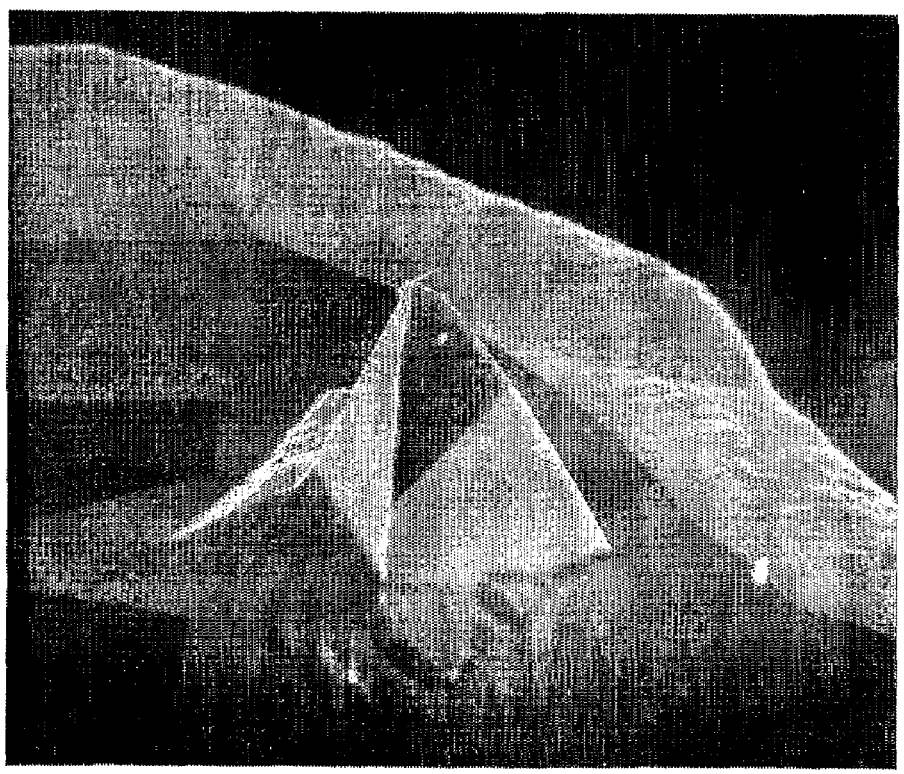

[Fig. 6]
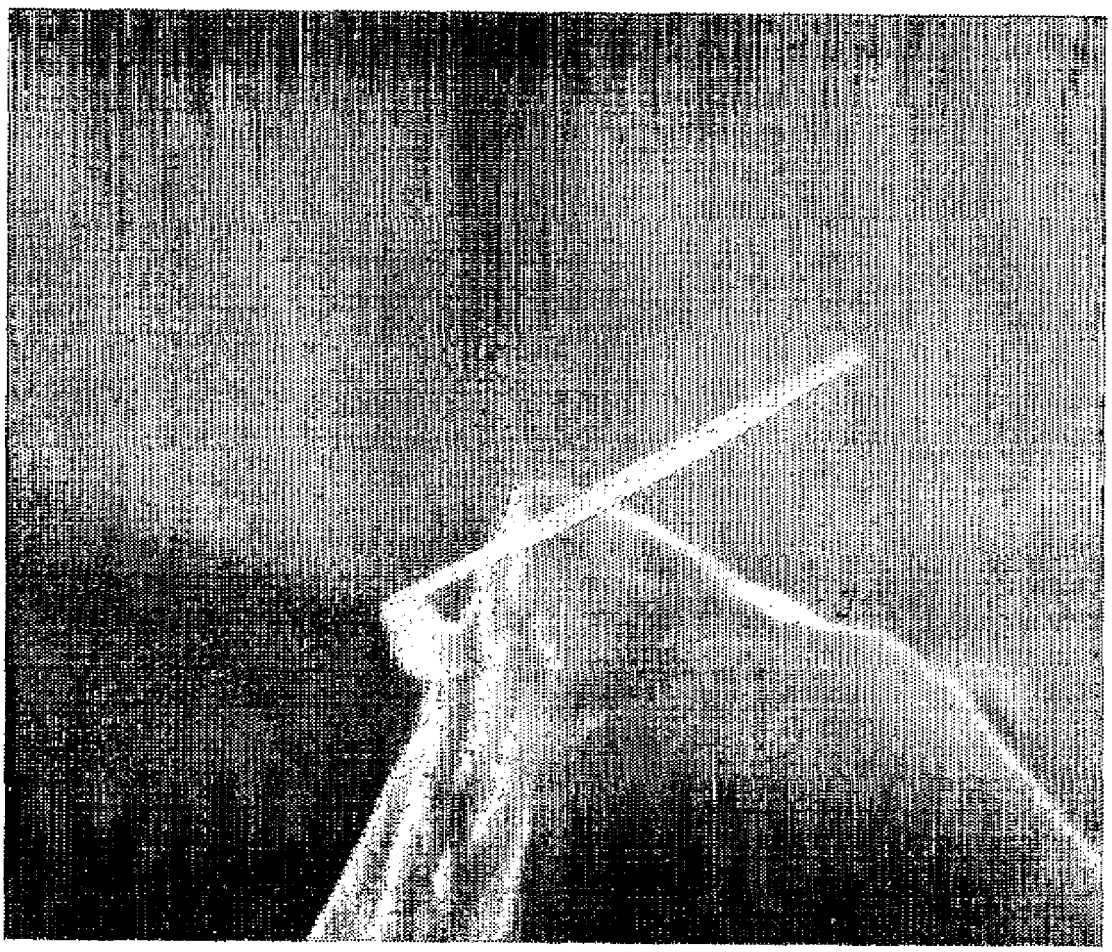

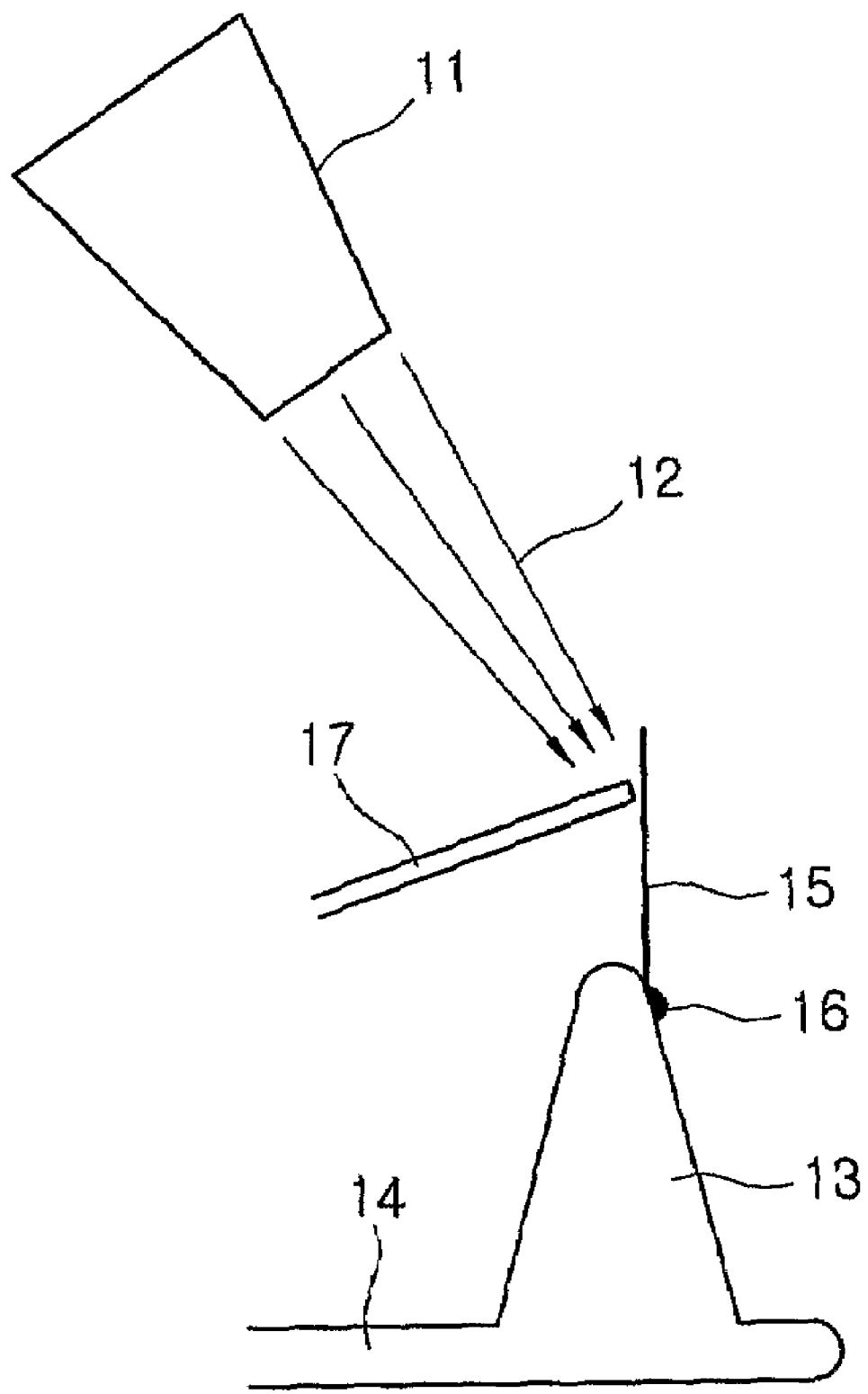
[Fig. 7]

[Fig. 8]
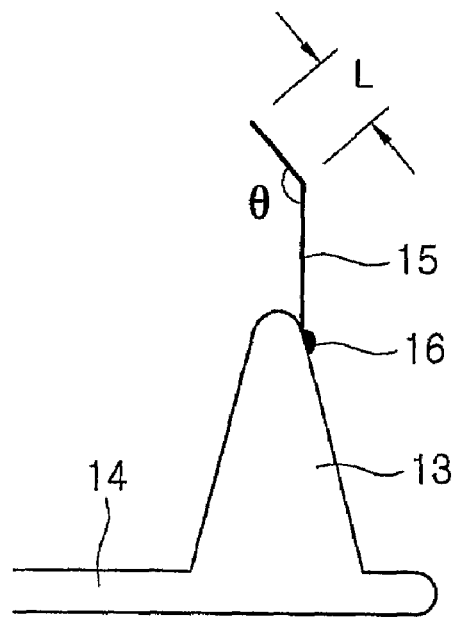
[Fig. 9]
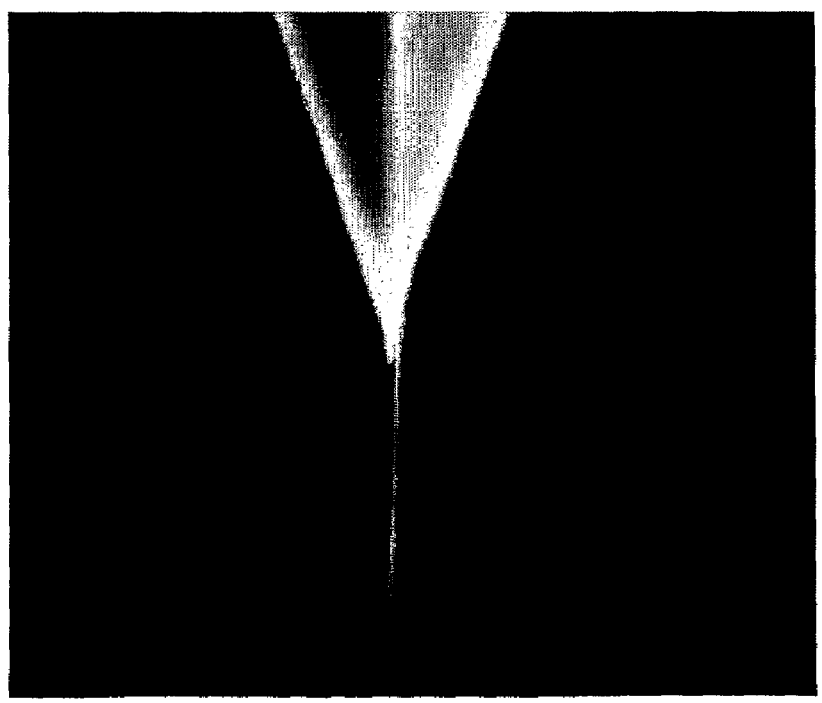

[Fig. 10]
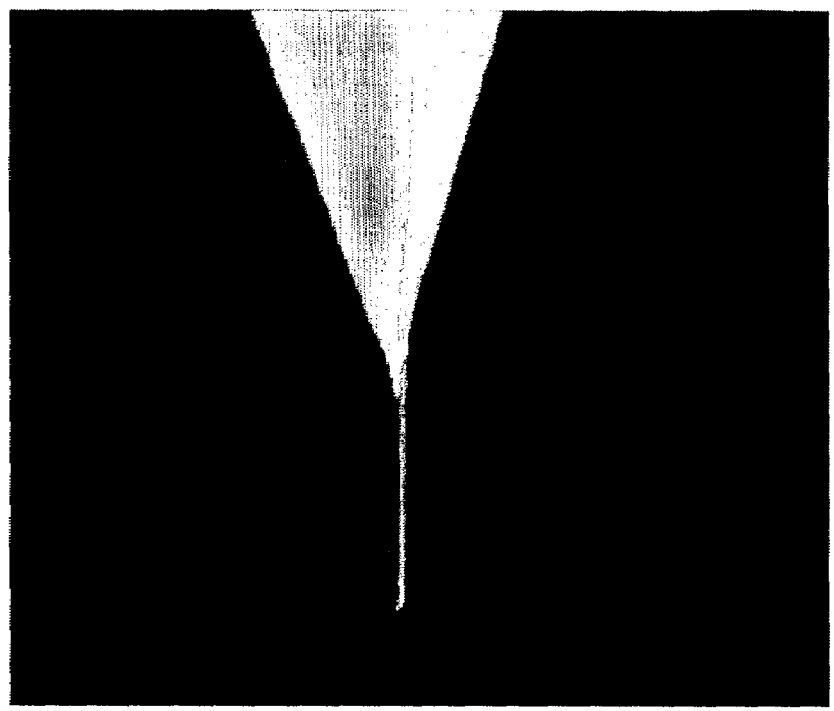
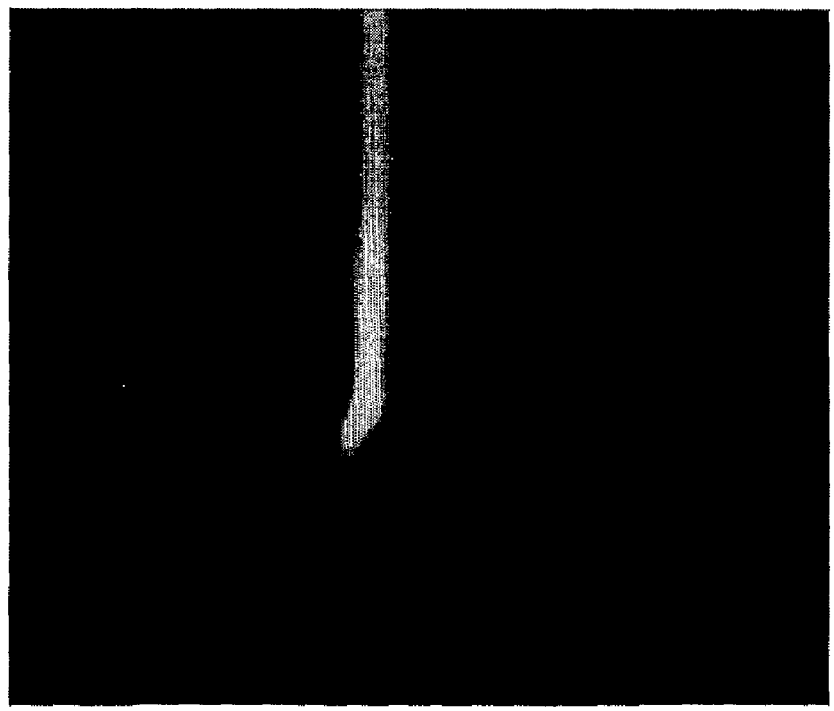

[Fig. 11]
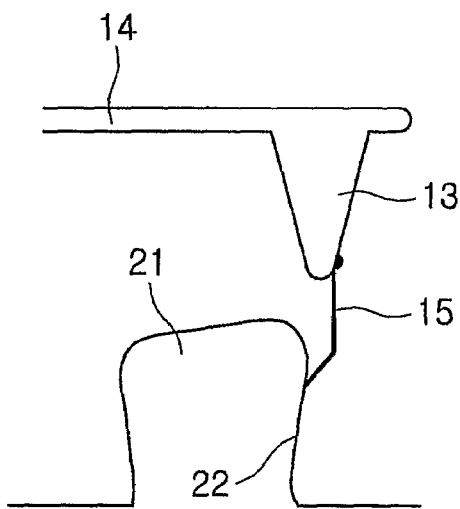
[Fig. 12]
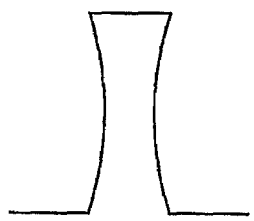
[Fig. 13]
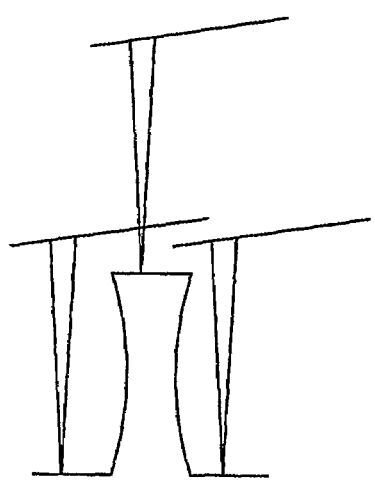

[Fig. 14]
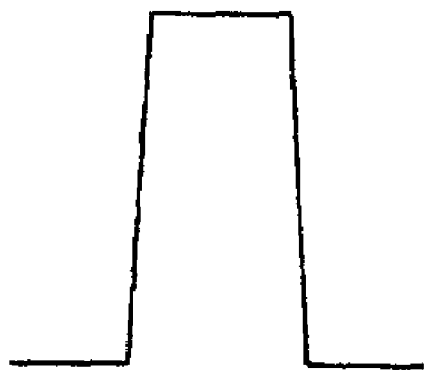
[Fig. 15]
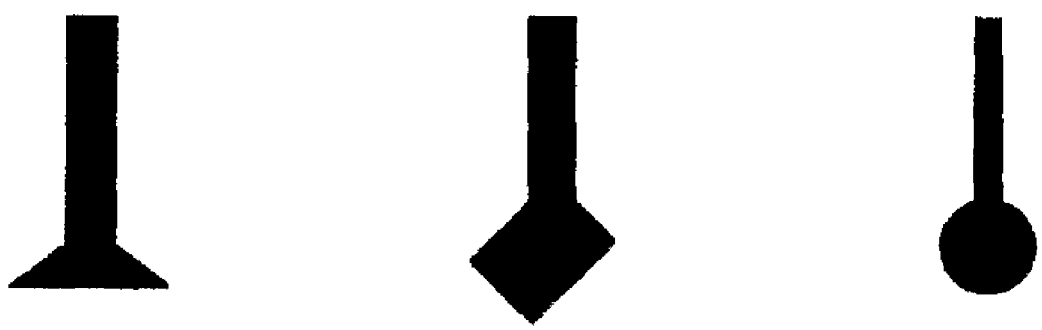

US 7,703,147 B2

METHOD FOR FABRICATING SPM AND CD-SPM NANONEEDLE PROBE USING ION BEAM AND SPM AND CD-SPM NANONEEDLE PROBE THEREBY

TECHNICAL FIELD

The present invention relates to a method for fabricating a scanning probe microscope (SPM) nanoneedle probe using an ion beam and a nanoneedle probe thereby. More particularly, the present invention relates to a method for fabricating a SPM nanoneedle probe capable of being easily adjusted with an intended pointing direction of a nanoneedle attached on a tip of the SPM nanoneedle probe and of being easily straightened with the nanoneedle attached on the tip of the SPM nanoneedle probe along the intended pointing direction, and to a SPM nanoneedle probe thereby.

Also, the present invention relates to a method for fabricating a critical dimension SPM (CD-SPM) nanoneedle probe capable of precisely scanning the sidewall of a sample object in nanoscale using an ion beam, and to a CD-SPM nanoneedle probe produced thereby. More particularly, the present invention relates to a method for fabricating a CD-SPM nanoneedle probe capable of precisely scanning the sidewall of the sample object in nanoscale by bending a portion of an end of the nanoneedle attached on the tip of the SPM nanoneedle probe in a specific angle toward a certain direction other than an original direction in which the nanoneedle attached on the tip of the SPM nanoneedle probe extends out, and to a CD-SPM nanoneedle probe thereby.

BACKGROUND ART

Hereinafter, a term "nanoneedle" includes what terms "nanotube" and "nanowire" refer to.

An SPM is a device used in a field of nanoscale technology, which is very powerful and useful as well as being delicate. The SPM is distinguished into various kinds such as an atomic force microscope (AFM) utilizing an atomic force applied between a probe and a sample object, a magnetic force microscope (MFM) utilizing a magnetic force applied between the probe and the sample object, an electrostatic force microscope (EFM) utilizing an electrostatic force applied between the probe and the sample object, and a scanning near field optical microscope (SNOM) utilizing an optical property of the sample object, etc.

Although it is widely known that the SPM as such has a resolution in atomic level, there still exists a need to sharpen an end (or a tip) of the probe used in the SPM to enhance the resolution of the SPM better. Because a conventional method which enhances an aspect ratio of a probe using semiconductor micromachining techniques has an inherent limitation in improving the resolution, a demand for an alternative method has been increased for sharpening the end of the probe. As a result, a method using the carbon nanotube emerged as the new alternative.

The carbon nanotube has a high aspect ratio as well as excellent electrical and mechanical properties as well known. Accordingly, a research has been undertaken on a method for scanning a sample object by the carbon nanotube attached on the tip of the SPM probe (mother probe).

As technologies related to the research mentioned above, there exist U.S. Pat. No. 6,528,785 which discloses a technology of attaching the carbon nanotube on the tip of the SPM probe using a coating film, and U.S. Pat. No. 6,759,653 which discloses a technology of attaching the carbon nanotube on the tip of the SPM probe using focused ion beam and severing the carbon nanotube attached on the tip of the SPM probe in a required length.

However, there are several significant technical factors in using the nanoneedle being attached on the tip of the SPM probe in accordance with the series of those technologies. Those factors are as follows: First, the attaching strength of the nanoneedle on the tip of the SPM probe; Second, the length adjustment of the nanoneedle attached on the tip of the SPM probe; third, adjustment of a pointing direction and shape of the nanoneedle attached on the tip of the SPM probe regardless of shape of the tip of the SPM probe.

U.S. Pat. Nos. 6,528,785 and 6,759,653 mentioned above have successfully satisfied two factors out of those three technical factors mentioned above, which are the attaching strength and the length adjustment. However, the third factor remains unsolved by any of the methods disclosed so far.

Korean patent application number 10-2002-0052591 filed by the applicant of the present invention discloses a fabricating apparatus to adjust the pointing direction of the nanoneedle attached on the tip of the SPM probe and a method for fabricating such nanoneedle. However, Korean patent application 10-2002-0052591 still has technical disadvantages of long process time and high cost required to fabricate a nanoneedle SPM probe as well as low throughput because the patent application utilizes a nanomanipulator and a medium attached the tip of the probe to adjust the pointing direction of the nanoneedle.

Further, despite that the variation of the pointing direction of the nanoneedle attached on the tip of the SPM probe has to be within 2 to 3 degree to scan in critical dimension (CD), it is nearly impossible to correctly adjust the pointing direction of the nanoneedle with such an accuracy by the conventional technologies. In addition, it should be noted that adjusting the accuracy of the pointing direction of the nanoneedle is required not only for scanning in CD as described above, but also for obtaining a correct scanning image using a general nanoneedle SPM probe Particularly, in case where the nanoneedle attached on the tip of the probe, is long, it becomes a more important to adjust the accuracy of the pointing direction of the nanoneedle.

Besides, in some cases, the nanoneedle attached on the tip of the SPM probe is either crooked or curled due to certain manufacturing problems. Accordingly, a technical means is required to straighten the nanoneedle attached on the tip of the SPM probe for such cases.

Also, the conventional SPM probe or the SPM nanoneedle probe having an end with a shape of a straight line has a limitation in scanning the shape of the sidewall of the sample object having irregularity in nanoscale level. In other words, in case of scanning the sidewall of the sample object having irregularity in nanoscale level using the probe as shown in FIG. 12, a distorted image being different from the actual shape of the sidewall of the sample object is obtained instead as shown in FIG. 14 because the probe scans the sidewall illustrated in FIG. 13.

Although U.S. Pat. No. 6,246,054 disclosed the SPM probe having an end with shapes illustrated in FIG. 15, it still has a disadvantage in that the method to fabricate such probes and the scanning method are too complicated. Besides, it has a certain limitation in accuracy of the scanning the sidewall of a sample object to be scanned.

Due to problems mentioned above, an alternative is needed to solve the technical problems related to the SPM nanoneedle probe.

DISCLOSURE OF INVENTION

Accordingly, it is an objective of the present invention to provide a method for fabricating a SPM nanoneedle probe capable of being easily adjusted with an intended pointing direction of a nanoneedle attached on a tip of the SPM nanoneedle probe and of being easily straightened with the nanoneedle attached on the tip of the SPM nanoneedle probe along the intended pointing direction, and to a SPM nanoneedle probe thereby.

It is another objective of the present invention to provide the method of fabricating the CD-SPM nanoneedle probe capable of scanning the sidewall of the sample object precisely, and the CD-SPM nanoneedle probe thereby.

An objective of the present invention is achieved by a method for fabricating a scanning probe microscope (SPM) nanoneedle probe using an ion beam, which comprises: positioning a tip of the SPM probe on which a nanoneedle is attached toward a direction in which the ion beam is irradiated; and aligning the nanoneedle attached on the tip of the SPM probe with the said ion beam in parallel by irradiating the ion beam in a direction toward the tip of the SPM probe on which the nanoneedle is attached, wherein said aligning the nanoneedle includes straightening the nanoneedle attached on the tip of the SPM probe along a direction in which the ion beam is irradiated.

It is preferable that the method for fabricating the SPM nanoneedle probe further comprises severing the nanoneedle attached on the tip of the SPM probe in a predetermined length by irradiating the focused ion beam in a specific angle from the nanoneedle attached on the tip of the SPM probe aligned parallelly with the ion beam.

Also, it is preferable that the ion beam used in the aligning the nanoneedle is focused ion beam.

Additionally, it is preferable that an acceleration voltage of the focused ion beam should be between 5 kV and 30 kV, an amount of current be between 1 pA and 1 nA, and time during which the nanoneedle is exposed to the FIB be between 1 and 60 seconds.

In addition, it is preferable that the focused ion beam is one of Ga ion beam, Au ion beam, Ar ion beam, Li ion beam, Be ion beam, He ion beam, and Au—Si—Be ion beam.

Also, an objective of the present invention is achieved by a nanoneedle probe of a SPM fabricated using the ion beam, which is characterized in that the nanoneedle attached on the tip of the SPM probe is aligned with the ion beam in parallel by irradiating the ion beam in a direction toward the tip of the SPM probe on which the nanoneedle is attached, and that the nanoneedle attached on the tip of the SPM probe is straightened along a direction of the ion beam by the ion beam irradiated toward the tip of the SPM probe.

It is preferable that the nanoneedle attached on the tip of the SPM probe is severed in a predetermined length by irradiating the ion beam in a specific angle from the nanoneedle attached on the tip of the SPM probe aligned in parallel with the ion beam.

Furthermore, another objective of the present invention is achieved by a method of fabricating a CD-SPM nanoneedle probe using the ion beam, which comprises screening a certain portion of the nanoneedle attached on the tip of the SPM probe using a mask, bending a part of the nanoneedle exposed out of the mask to align the part of the nanoneedle in a direction of the irradiated ion beam by irradiating the ion beam on the part of the nanoneedle exposed out of the mask, as well as by a CD-SPM nanoneedle probe thereby.

BRIEF DESCRIPTION OF DRAWINGS

These objectives of the present invention are apparent from and will be elucidated with reference to the embodiment described hereinafter, although the present invention is not limited to the embodiment.

In the drawings:

FIG. 1 illustrates a method for fabricating a nanoneedle probe used in a scanning probe microscope (SPM) according to an embodiment of the present invention, schematically.

FIGS. 2 and 3 are photographs of a tip of a scanning electron microscope (SEM) attached with a nanoneedle before radiation of ion beam and after the radiation of the ion beam, respectively.

FIG. 4 illustrates assigning a patterning area of a focused ion beam (FIB) system, schematically.

FIGS. 5 and 6 are photographs of SEM after irradiating the ion beam on the patterning area shown in FIG. 3.

FIG. 7 illustrates schematically a method to fabricate a CD-SPM nanoneedle probe according to another embodiment of the present invention.

FIG. 8 illustrates schematically a shape of the CD-SPM nanoneedle probe processed by the method illustrated in FIG. 7.

FIG. 9 is a photograph of the SPM nanoneedle before being processed by the method illustrated in FIG. 7.

FIG. 10 is a photograph of the CD-SPM nanoneedle probe after being processed by the method illustrated in FIG. 7.

FIG. 11 illustrates schematically how a CD-SPM nanoneedle probe fabricated according to the present invention scans a re-entrant sidewall of a sample object.

FIG. 12 through 14 illustrate schematically a process of scanning the re-entrant sidewall using a conventional SPM probe and a result from the scanning.

FIG. 15 illustrates various shapes of an end of the conventional SPM probe fabricated to scan the different sidewall features of the sample object.

BEST MODE FOR CARRYING OUT THE INVENTION

Reference will now be made in detail to the aspects of the present invention, examples of which are illustrated in the accompanying drawings, wherein like reference numerals refer to like elements throughout. The aspects are described below in order to explain the present invention by referring to the figures.

As mentioned above, the term "nanoneedle" used hereinafter includes what terms "nanotube" and "nanowire" refer to. Also, the method of fabricating the SPM nanoneedle probe or the CD-SPM nanoneedle probe according to the present invention can be applied to all kinds of nanotube including a commonly used nanotube such as carbon nanotube, BCN nanotube, or BN nanotube, a single-walled nanotube, a double-walled nanotube, or a multi-walled nanotube, regardless of the kind of the nanotube.

Hereafter, preferred embodiments according to the present invention will be described in detail as examples with reference with the accompanying drawings.

Since the prior patent documents mentioned above, already disclosed a method of attaching the nanoneedles on the tips of the SPM probes, the present application omits a description on the detailed technologies pertaining to such methods.

FIG. 1 schematically illustrates a method for fabricating a nanoneedle probe used in a scanning probe microscope (SPM) according to an embodiment of the present invention. An SPM is shown on the bottom of the FIG. 1 which particularly describes a tip of an atomic force microscope (AFM) comprising a cantilever 14 and a tip 13 protruding from the cantilever 14, and a nanoneedle 15' or 15 attached on an end of the tip 13. It will be explained later why one nanoneedle is indicated by two numerals 15' and 15. Generally, the nanoneedle 15' or 15 attached on the tip 13 of the probe is attached on an end of the tip 13 of the probe by a method of welding with impurities 16. The upper part of FIG. 1 schematically shows an ion column 11 and ion beam irradiated toward the nanoneedle 15' or 15 from the ion column 11.

As mentioned above in the description of the related art, it is not easy to adjust a pointing direction of the nanoneedle 15' when attaching the nanoneedle 15' on the end of the tip 13 of the probe using the impurities 16 because the tip 13 of the probe has a shape such as a pyramid, or a cone.

The above mentioned Korean patent document discloses a method which is characterized in that a medium is attached on a tip of a probe so that a surface on which a nanoneedle is to be attached can be prepared before attaching the nanoneedle so as to adjust a pointing direction of the nanoneedle, or in that the pointing direction of the nanoneedle is adjusted using a nanoneedle manipulator. However, such method cannot provide the required accuracy of a direction of the nanoneedle (approximately, 2 to 3 degrees) attached on the tip of the probe, which is required for scanning the critical dimension (CD). Besides, even if the required accuracy can be obtained by chance, it would normally require numerous trial-and-error attempts. Thus, production throughput has to be extremely low.

Meanwhile, the method of fabricating the nanoneedle probe used in SPM according to the present invention may solve such a fundamental problem compared with prior technology.

In FIG. 1, a numeral 15' indicates a nanoneedle being attached on the tip 13 of the probe and having a direction and shape before ion beam 12 is irradiated toward the nanoneedle 15' from the ion column 11. A numeral 15 indicates a nanoneedle being attached on the tip 13 of the probe and having a direction and shape after ion beam 12 is irradiated toward the nanoneedle 15' from the ion column 11.

As shown in the drawing, it may be noted not only that the direction of the nanoneedle 15' became parallel with the ion beam 12 due to an effect of the ion beam 12, but also that the crooked nanoneedle 15' attached on the tip of the probe is straightened.

In other words, after positioning the tip 13 of the probe so that the tip 13 of the probe faces toward the direction in which the ion beam 12 would be irradiated, the ion beam 12 is irradiated toward the tip 13 of the probe on which the nanoneedle 15' is attached. Then, the nanoneedle 15' attached on the tip 13 of the probe is aligned in parallel with the ion beam 12. Besides, it is clearly shown in the drawing that the nanoneedle 15' attached on the tip 13 of the probe is straightened along a direction in which the ion beam 12 is irradiated.

FIGS. 2 and 3 are photographs of experiment results, which supports such facts described above more clearly. FIG. 2 shows a photograph of the tip of the scanning electron microscope (SEM) on which the nanoneedle is attached before irradiating the ion beam, while FIG. 3 shows a photograph of the SEM after irradiating the ion beam.

As shown in FIGS. 2 and 3, it is noted not only that the nanoneedle attached on the tip 13 of the probe is aligned in a direction in which the ion beam is irradiated, but also that the nanoneedle is straightened in the direction of the ion beam. An experiment that shows the results of the drawings is implemented using a focused ion beam (FIB) system and Ga ion beam is used as the ion beam.

The inventor of the present invention varied an acceleration voltage of the ion beam, an amount of current of the ion beam, and time during which the nanoneedle is exposed to the ion beam through a number of experiments to obtain an optimal condition required for fabricating the SPM nanoneedle probe having most excellent properties.

With results from such experiments, it is noted that the pointing direction of the nanoneedle is easily changed toward the direction of the radiation of the ion beam as the acceleration voltage and the amount of current of the ion beam gets bigger and the exposure time gets longer. Besides such general results, the inventor of the present invention found that it is preferable that the acceleration voltage of the ion beam should be 5 kV to 30 kV, the amount of current of the ion beam be 1 pA to 1 nA, and the time during which the nanoneedle is exposed to the ion beam be 1 to 60 seconds.

The ion beam that may be used in the method of fabricating the SPM nanoneedle probe according to an embodiment of the present invention includes various kinds of ion beams such as Au ion beam, Ar ion beam, Li ion beam, Be ion beam, He ion beam, and Au—Si—Be ion beam as well as Ga ion beam.

The inventor of the present invention implemented another experiment to confirm more clearly a phenomenon that the pointing direction and the shape of the nanoneedle attached on the tip of the probe are changed as desired. FIG. 4 schematically illustrates assigning a patterning area where the ion beam would pass before initiation of a FIB system. In FIG. 4, the patterning area is indicated by a rectangle transversing the nanoneedle attached on the tip of the probe. In other words, in the experiment, the ion beam is irradiated toward the upper part of the rectangle after assigning the patterning area as shown in FIG. 4.

FIG. 5 is a photograph of SEM after irradiating the focused ion beam toward the nanoneedle by the FIB system after assigning patterning area. FIG. 6 is a photograph of SEM magnified on an end of the tip of the probe on which the nanoneedle is attached.

As shown in the FIGS. 5 and 6, it is clearly noted not only that the nanoneedle attached on the tip of the probe is aligned along the direction of the ion beam, but also that the nanoneedle is straightened along the direction of the ion beam.

With such results that the nanoneedle attached on the tip of the probe is aligned in parallel with the radiated ion beam as described above, the pointing direction of the nanoneedle attached on the tip of the probe must be achieved with the desired accuracy (ranging between 2 and 3 degree), which cannot be achieved by the conventional technology. Also, with the same results, a nanoneedle probe with the shape and the pointing direction having sufficient level of accuracy enabling scanning in critical dimension (CD) must be implemented.

The present invention can realize the nanoneedle probe with the pointing direction and the shape having the accuracy good enough to scan the critical dimension (CD), which was not solved by the conventional technology.

The inventor of the present invention implemented the same experiment with increased strength of the focused ion beam of the FIB system after assigning the patterning area as shown in FIG. 4. In such a case it is noted that the nanoneedle is severed as described in the above-mentioned U.S. Pat. No. 6,759,653.

With such results, the inventor of the present invention concluded that while the pointing direction and the shape of the nanoneedle are adjusted by the effect of the ion beam within a specific threshold of the strength of the ion beam irradiated on the nanoneedle, the nanoneedle is severed over the threshold.

Accordingly, it can be clearly appreciated by those skilled in the art that the pointing direction and the shape of the nanoneedle are adjusted by fitting properly the acceleration voltage, the amount of current, and the exposure time of the ion beam irradiated on the nanoneedle attached on the tip of the SPM probe.

On a basis of such results from the experiment, FIG. 7 illustrates schematically a method to fabricate a CD-SPM nanoneedle probe according to another embodiment of the present invention. In the same way as shown in FIG. 1, an SPM probe is shown on the bottom of the FIG. 7 which specifically describes a tip of an AFM comprising a cantilever 14 and a tip 13 protruding from the cantilever 14, and a nanoneedle 15' or 15 attached on an end of the tip 13. As described above, the nanoneedle 15 attached on the tip 13 of the probe is attached on an end of the tip of the probe by the method of welding with impurities 16.

In the same way as shown in FIG. 1, the ion column 11 and the ion beam irradiated toward the nanoneedle 15 from the ion column 11 are illustrated on the left side of the FIG. 7. The only difference from FIG. 1 is that FIG. 7 includes a mask 17 to screen a portion under a certain part of the nanoneedle.

As such, if the certain portion of the nanoneedle 15 attached on the tip 13 of the probe is screened by the mask 17 and the ion beam is irradiated from one side as shown in FIG. 7, a portion of the nanoneedle 15 exposed to the ion beam is bent as shown in FIG. 8.

The length L of the bent portion of the nanoneedle 15 can be adjusted by fitting an area of the nanoneedle 15 screened by the mask 17. Also, the angle θ in which the nanoneedle 15 is bent can be adjusted by fitting an angle in which the ion column 11 irradiates the ion beam 12.

Accordingly, a CD-SPM nanoneedle probe of desired shape can be manufactured by fitting a degree of screening with the mask 17 and the angle of the radiation of the ion beam 12 properly.

Also, the CD-SPM nanoneedle probe can be fabricated either by a process illustrated in FIG. 7 after aligning the nanoneedle attached on the tip 13 of the probe using the ion beam according to the method shown in FIG. 1, or just by the process illustrated in FIG. 7 without having to aligning the nanoneedle as such.

FIG. 9 is a photograph of the SPM nanoneedle before being processed by the method illustrated in FIG. 7, while FIG. 10 is a photograph of the CD-SPM nanoneedle probe after being processed by the method illustrated in FIG. 7. As shown in FIG. 10, it may be clearly recognized that an end of the nanoneedle is bent.

FIG. 11 illustrates schematically how a CD-SPM nanoneedle probe fabricated according to the present invention scans a sidewall 22 of a sample object having an irregularity 21. As mentioned above, by adjusting properly the length and its angle of the bent portion of the nanoneedle, depending on the degree of the irregularity of the sample object, according to the method illustrated in FIG. 7, the sidewall having the irregularity of the sample object may be scanned precisely. The CD-SPM nanoneedle probe fabricated in a manner described so far may be used to obtain a precise image of the sidewall having the irregularity of the sample object without any distortion on the image of the side surface of the sample object.

The present invention has an advantage that the accuracy of the pointing direction and the shape of the SPM nanoneedle probe are improved by providing the method of fabricating the SPM nanoneedle probe capable of being easily adjusted with the intended pointing direction of the nanoneedle attached on the tip of the SPM nanoneedle probe and of being easily straightened with the nanoneedle attached on the tip of the SPM nanoneedle probe along the intended pointing direction, and by providing the SPM nanoneedle probe fabricated thereby. Besides, the present invention has an advantage of improving the throughput of the SPM nanoneedle probe by using such method.

In addition, the present invention has an advantage that the sidewall of the sample object may be scanned precisely in nanoscale by providing the method of fabricating the CD-SPM nanoneedle probe capable of scanning the sidewall of the sample object precisely, and the CD-SPM nanoneedle probe thereby.

Although a few embodiments of the present invention have been shown and described, it will be appreciated by those skilled in the art that changes may be made in these aspects without departing from the principles and spirit of the invention, the scope of which is defined in the appended claims and their equivalents.

The invention claimed is:

1. A method for fabricating a scanning probe microscope (SPM) nanoneedle probe using an ion beam, comprising:
    positioning the probe so that a tip of the probe on which the nanoneedle is attached faces toward a direction in which the ion beam is irradiated; and
    aligning the nanoneedle attached on the tip of the probe with the ion beam in parallel by irradiating the ion beam toward the tip of the probe on which the nanoneedle is attached.

2. The method as claimed in claim 1, which is characterized in that the aligning the nanoneedle comprises straightening the nanoneedle attached on the tip of the probe along the direction in which the ion beam is irradiated.

3. The method as claimed in claim 1, further comprising severing the nanoneedle attached on the tip of the probe in a predetermined length by irradiating a focused ion beam in a specific angle from the nanoneedle being attached on the tip of the probe and being aligned in parallel with the ion beam.

4. The method as claimed in claim 1, further comprising:
    screening a certain portion of the nanoneedle aligned by the ion beam using a mask; and
    bending a part of the nanoneedle exposed out of the mask to align the part of the nanoneedle by re-irradiating the ion beam on the part of the nanoneedle exposed out of the mask, along the direction of the re-irradiated ion beam, in a specific angle from a direction of alignment of the nanoneedle.

5. The method as claimed in claim 1, which is characterized in that the ion beam is a focused ion beam.

6. The method as claimed in claim 5, which is characterized in that an acceleration voltage of the focused ion beam is 5 kV to 30 kV, an amount of current is IpA to InA, and the time during which the nanoneedle is exposed to the focused ion beam is 1 to 60 seconds.

7. The method as claimed in claim 5, which is characterized in that the focused ion beam is one of Ga ion beam, Au ion beam, Ar ion beam, Li ion beam, Be ion beam, He ion beam, and Au—Si—Be ion beam.

8. The method as claimed in claim 1, which is characterized in that the nanoneedle is either one of nanotube and nanowire.

9. An SPM nanoneedle probe fabricated using an ion beam, which is characterized in that a nanoneedle attached on a tip of the probe is aligned in parallel with the ion beam by irradiating the ion beam toward the tip of the probe on which the nanoneedle is attached.

10. The SPM nanoneedle probe as claimed in claim 9, which is characterized in that the nanoneedle attached on the tip of the probe is straightened by the ion beam irradiated toward the tip of the probe, along a direction of the ion beam.

11. The SPM nanoneedle probe as claimed in claim 9, which is characterized in that the nanoneedle attached on the tip of the probe is severed in a predetermined length by irradiating a focused ion beam in a specific angle from the nanoneedle being attached on the tip of the probe and being aligned in parallel with the ion beam.

12. The SPM nanoneedle probe as claimed in claim 9, which is characterized in that a certain portion of the nanoneedle aligned by the ion beam is screened by a mask; and in that a part of the nanoneedle exposed out of the mask is bent so that the part of the nanoneedle is aligned by re-irradiating the ion beam on the part of the nanoneedle exposed out of the mask, along the direction of the re-irradiated ion beam, in a specific angle from a direction of alignment of the nanoneedle.

13. The SPM nanoneedle probe as claimed in claim 9, which is characterized in that the ion beam is a focused ion beam.

14. The SPM nanoneedle probe as claimed in claim 13, which is characterized in that an acceleration voltage of the focused ion beam is 5 kV to 30 kV, an amount of current is IpA to InA, and the time during which the nanoneedle is exposed to the focused ion beam is 1 to 60 seconds.

15. The SPM nanoneedle probe as claimed in claim 13, which is characterized in that the focused ion beam is one of Ga ion beam, Au ion beam, Ar ion beam, Li ion beam, Be ion beam, He ion beam, and Au—Si—Be ion beam.

16. The SPM nanoneedle probe as claimed in claim 9, which is characterized in that the nanoneedle is either one of nanotube and nanowire.

17. A method of fabricating a critical dimension scanning probe microscope (CD-SPM) nanoneedle probe using an ion beam, comprising:

screening a certain portion of the nanoneedle attached on a tip of the probe using a mask; and bending a part of the nanoneedle exposed out of the mask to align the part of the nanoneedle by irradiating the ion beam on the part of the nanoneedle exposed out of the mask, along the direction of the irradiated ion beam.

18. The method as claimed in claim 17, which is characterized in that the ion beam is a focused ion beam.

19. The method as claimed in claim 18, which is characterized in that an acceleration voltage of the focused ion beam is 5 kV to 30 kV, an amount of current is IpA to InA, and the time during which the nanoneedle is exposed to the focused ion beam is 1 to 60 seconds.

20. The method as claimed in claim 18, which is characterized in that the focused ion beam is one of Ga ion beam, Au ion beam, Ar ion beam, Li ion beam, Be ion beam, He ion beam, and Au—Si—Be ion beam.

21. The method as claimed in claim 17, which is characterized in that the nanoneedle is either one of nanotube and nanowire.

22. A CD-SPM nanoneedle probe fabricated using an ion beam, which is characterized in that a certain portion of the nanoneedle attached on a tip of the probe is screened by a mask; and in that a part of the nanoneedle exposed out of the mask is bent so that the part of the nanoneedle is aligned by irradiating the ion beam on the part of the nanoneedle exposed out of the mask, along the direction of the irradiated ion beam.

23. The CD-SPM nanoneedle probe as claimed in claim 22, which is characterized in that the ion beam is a focused ion beam.

24. The CD-SPM nanoneedle probe as claimed in claim 23, an acceleration voltage of the focused ion beam is 5 kV to 30 kV, an amount of current is IpA to InA, and the time during which the nanoneedle is exposed to the focused ion beam is 1 to 60 seconds.

25. The CD-SPM nanoneedle probe as claimed in claim 23, which is characterized in that the focused ion beam is one of Ga ion beam, Au ion beam, Ar ion beam, Li ion beam, Be ion beam, He ion beam, and Au—Si—Be ion beam.

26. The CD-SPM nanoneedle probe as claimed in claim 22, which is characterized in that the nanoneedle is either one of a nanotube and a nanowire.

* * * * *